United States Patent [19]
Meaney et al.

[11] Patent Number: 5,976,997
[45] Date of Patent: Nov. 2, 1999

[54] LIGHTWEIGHT FIRE PROTECTION ARRANGEMENT FOR AIRCRAFT GAS TURBINE JET ENGINE AND METHOD

[75] Inventors: John E. Meaney, Bonita; Jeffrey K. Switzer; Richard L. Till, both of San Diego, all of Calif.

[73] Assignee: Rohr, Inc., Chula Vista, Calif.

[21] Appl. No.: 08/745,707

[22] Filed: Nov. 12, 1996

[51] Int. Cl.$^6$ .......................... B32B 15/08; B32B 18/00; C09J 5/02

[52] U.S. Cl. .......................... 442/232; 442/236; 442/261; 442/262; 442/302; 442/260; 428/920; 428/921; 156/60; 156/307.3; 156/307.7; 244/129.1

[58] Field of Search .............................. 428/73, 116, 117, 428/920, 921, 118, 911, 290, 315.5, 315.7, 315.9; 169/26, 57; 52/806; 264/29.1, 29.7, 62, 81, 258; 501/89, 90, 95, 100, 133; 442/232, 236, 260, 261, 262, 302; 156/60, 307.3, 307.7

[56] References Cited

U.S. PATENT DOCUMENTS

| | | | |
|---|---|---|---|
| 3,117,597 | 1/1964 | Fritz et al. | 138/125 |
| 3,858,618 | 1/1975 | Kaufman | 137/149 |
| 4,046,406 | 9/1977 | Press et al. | 285/47 |
| 4,156,533 | 5/1979 | Close et al. | 277/229 |
| 4,190,088 | 2/1980 | Lalikos et al. | 138/26 |
| 4,251,579 | 2/1981 | Lee et al. | 428/73 |
| 4,675,221 | 6/1987 | Lalikos et al. | 428/36 |
| 4,714,650 | 12/1987 | Obayashi et al. | 428/266 |
| 4,798,814 | 1/1989 | Everitt et al. | 501/89 |
| 4,883,779 | 11/1989 | McCallister et al. | 501/88 |
| 4,943,475 | 7/1990 | Baker et al. | 428/246 |
| 4,961,989 | 10/1990 | Grimwood | 428/266 X |
| 4,994,317 | 2/1991 | Dugan et al. | 428/266 X |
| 5,292,575 | 3/1994 | Metivaud | 420/920 X |
| 5,350,545 | 9/1994 | Streckert et al. | 264/29.1 |
| 5,571,625 | 11/1996 | Porte et al. | 428/447 |
| 5,599,112 | 2/1997 | Klein | 384/624 |

*Primary Examiner*—Mary E. Mosher
*Attorney, Agent, or Firm*—Patrick J. Schlesinger

[57] ABSTRACT

A light weight composite layer arrangement for providing protection for a metal surface from a fire for a predetermined period of time in compliance with Federal Airworthiness Regulation 25. The arrangement which may be easily installed on a metal surface, which typically is an aluminum alloy, includes a silicone rubber sealant layer that is applied to the metal surface in an uncured non-flowing state. A layer of ceramic fiber fabric is then applied to the first silicone rubber sealant layer and due to its inherent flexibility easily conforms to the contours of the underlying metal surface. A second silicone rubber sealant layer may then be applied in its uncured non-flowing state over the ceramic fiber layer to essentially embed the ceramic fabric layer between the two silicone rubber layers. The silicone rubber sealant layers may then be cured at room temperature. Alternatively, the first silicone rubber sealant layer may be cured after application of the ceramic fiber fabric layer and prior to the application of the second silicone rubber sealant layer. Reinforcing or other structures may then be attached to the metal surface, such as by riveting. The resultant protective arrangement is resistant to common solvents, engine oil, hydraulic fluids, and jet fuel and to vibration so as to be able to provide the required fire protection as may be required. The invention finds particular application in the components of an aircraft gas turbine jet engine propulsion system.

20 Claims, 1 Drawing Sheet

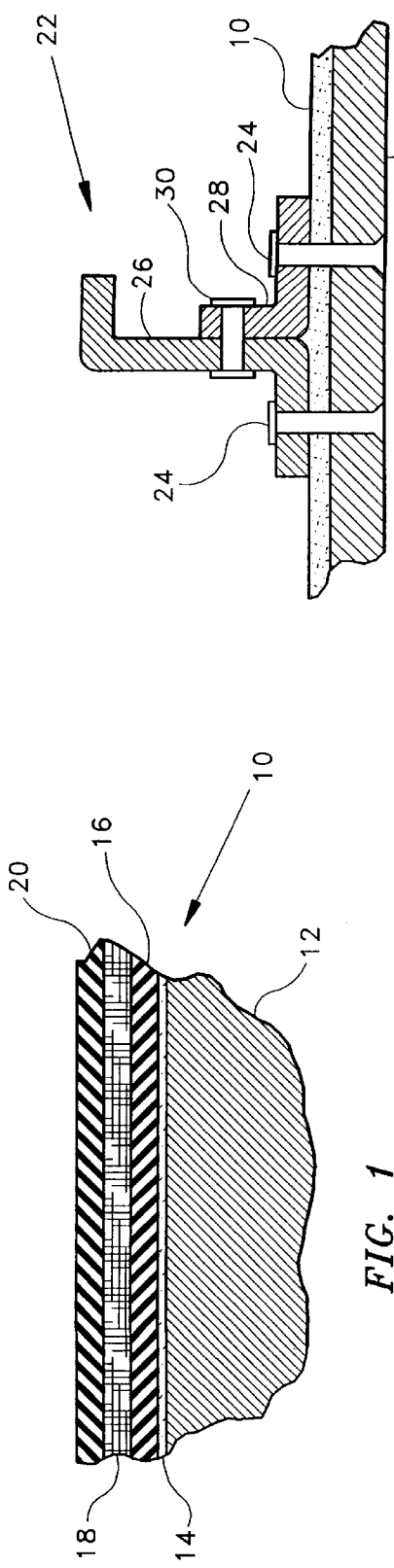
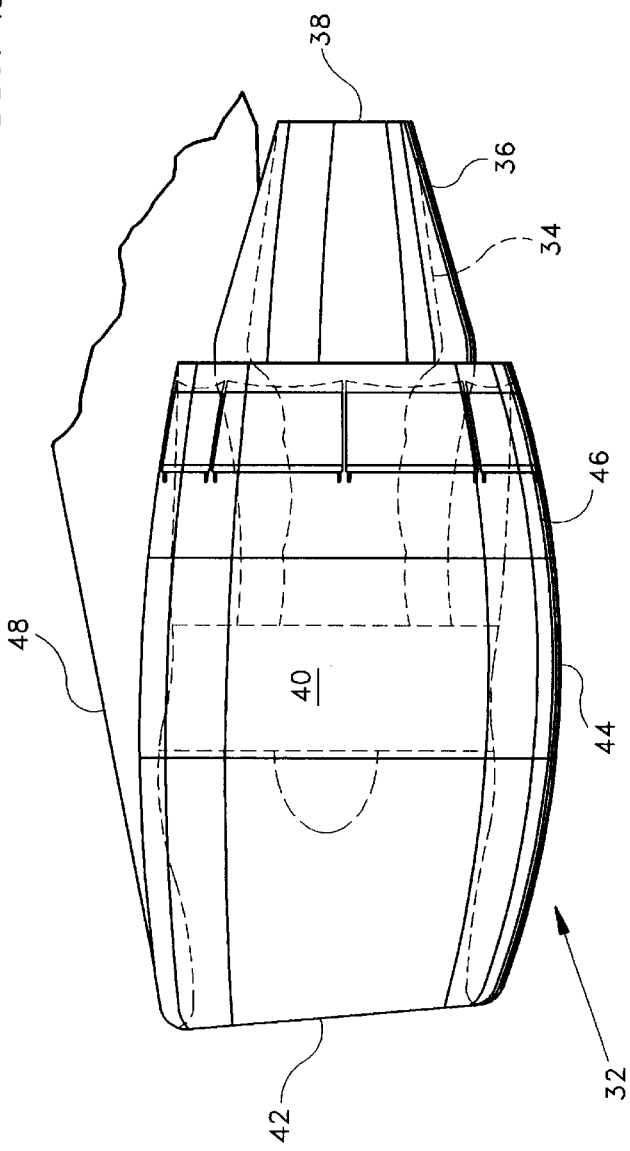

LIGHTWEIGHT FIRE PROTECTION ARRANGEMENT FOR AIRCRAFT GAS TURBINE JET ENGINE AND METHOD

BACKGROUND OF THE INVENTION

The present invention relates to an improvement in fire protection systems and more particularly, but not by way of limitation, to a lightweight fire protection arrangement for an aircraft gas turbine jet engine and to the method of providing such an arrangement.

In the construction of aircraft it is recognized that regardless of the precautions taken by a manufacturer of an aircraft and by an operator of such aircraft in commercial use, a fire hazard does occur from time to time in connection with the leakage of jet fuel. Such a fire hazard would tend to occur in the direct vicinity of an aircraft gas turbine jet engine during operation. While the present invention has immediate application to aircraft gas turbine jet engine propulsion systems, it would also be equally applicable to other applications where it is necessary or desirable to provide fire protection, such as the auxiliary power unit (APU) of an aircraft or other metal surfaces of the aircraft that could be exposed to fire from jet fuel such as in the pylon structure.

The Federal Aeronautics Agency (FAA) has established a standard identified as the Federal Airworthiness Regulation 25 (FAR 25) which requires fire protection arrangements for aircraft gas turbine jet engine enclosures (i.e. nacelles) be able to withstand a 2000° F. (1204° C.) for 15 minutes to preclude flame penetration to the protected metal surface where it would cause melting of such metal and other undesired consequences. One present arrangement known in the art for providing fire protection for metal surfaces associated with an aircraft jet engine provides for the bonding of a stainless steel foil layer around 0.005 inch in thickness to the metal surface to be protected by means of a suitable silicone rubber sealant. While this arrangement does meet the FAA standard, the provision of a stainless steel layer obviously adds weight and cost to an engine nacelle. Further, a stainless steel layer is very difficult to deform to meet the severe contours of the protected metal surface. Thus, a need exists for a light weight, lower cost fire protection arrangement for aircraft gas turbine jet engines that permits ease of installation and which meets the FAA requirements.

The prior art patents reveal certain protective arrangements that are of interest. For example, U.S. Pat. No. 5,484,263 is directed to a heat shield for the hot section nozzle insert of a gas turbine engine that is subjected to elevated service temperatures. The heat shield includes a barrier layer comprising nitrides or oxides that are deposited on a metal such as a nickel-base superalloy by chemical and physical vapor deposition. A reflective coating forms a reflective surface on the barrier layer and is formed of a noble metal such as platinum or gold. This heat shield is intended to reflect heat from a metal insert in an aircraft engine but is not intended to contain a fire.

U.S. Pat. No. 4,441,726 is directed to a heat and vibration resistant seal arrangement for a butterfly valve for the control of exhaust gases from diesel powered engines used to power gas pumping stations and compressor stations. The seal assembly comprises a central core member constructed of a dense resilient metal wire mesh rope, an intermediate cover layer of braided, ceramic fiber sleeving material, and an outer wrap layer of braided wire mesh. The seal assembly is intended for use only as a seal for an impinging butterfly valve member of a valve assembly subject to elevated temperatures and vibration and is not intended for fire protection for an aircraft gas turbine jet engine.

U.S. Pat. No. 5,524,846 relates to a fire protection system for the strut and wing structure of an airplane. This fire protection system includes first and second sets of metal fingers that are attached to the exhaust nozzle outer sleeve and which bear against the strut structure to maintain firewall integrity and prevent hot exhaust gases from passing forwardly into the strut structure and wing area.

Other patents such as U.S. Pat. Nos. 5,514,198; 5,489,074, and 4,037,751 disclose various thermal protection arrangements such as insulating blankets or tiles that are particularly adapted for protection of the air flow side of a space vehicle upon re-entry into the atmosphere of the earth and are not intended to provide fire protection for a fire emanating from within the space vehicle.

Thus, it is a general object of the present invention to provide a light weight, lower cost, fire protection arrangement for a metal surface of a structure associated with an aircraft gas turbine jet engine.

It is a further general object to provide an arrangement and method of easily installing such an arrangement on a metal surface of an aircraft engine nacelle component to contain a jet fuel fire for a predetermined period of time to preclude melting of the metal surface and flame penetration of such surface to injure other components of an aircraft.

The foregoing has outlined some of the more pertinent objects of the invention. These objects should be construed to be merely illustrative of some of the more prominent features and application of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawing.

SUMMARY OF THE INVENTION

Briefly stated, the present invention contemplates a light weight, easily installed, lower cost arrangement for providing protection for a metal surface from a fire for a predetermined period of time in accordance with FAA requirements. Typically, a suitable metal such as an aluminum alloy is used to provide nacelle components and a pylon structure for supporting an aircraft gas turbine jet engine from an aircraft wing and enclosing such engine to provide an aerodynamic air flow thereover. The arrangement of the present invention provides for a metal surface, such as an aluminum alloy, that has been suitably anodized in accordance with the requirements of the aircraft industry to be cleaned by suitable solvent and abrasive methods. Any residue remaining from such cleaning procedures is carefully removed. A suitable primer coat is then applied to the cleaned anodized aluminum surface to provide stronger and more uniform bonds.

A layer of a suitable silicone rubber sealant is then applied in its uncured state. Typically, a silicone rubber sealant is a two part system consisting of the base material and a catalyst which are mixed together to form a non-flowing material that may be applied and tooled to any desired configuration and build up.

A layer of a light weight ceramic fiber fabric is then applied to the uncured silicone rubber sealant layer. The ceramic fiber fabric layer is preferably woven from strong continuous alumina-boria-silica composition fibers and provides strength and flexibility with little shrinkage at elevated temperatures. The drapability of the ceramic fiber fabric permits it to be easily contoured to meet the curvatures of the metal surface. When the ceramic fiber layer is applied to the uncured silicone rubber layer, a slight pressure may be exerted on the ceramic layer to enhance the tendency of such silicone sealant to wick up or be forced up into the ceramic fabric whereby such fabric layer is, in effect, embedded within the first silicone rubber layer and the silicone rubber layer may then be cured if so desired.

A second layer of silicone rubber sealant may then be applied in its uncured state to the outer surface of the ceramic fiber layer so that the ceramic fiber layer is further embedded within the two layers of silicone rubber sealant. Alternatively, the first and second silicone rubber sealant layers may be co-cured at the same time. The resulting composite layer arrangement is then cured at room temperature. The silicone rubber sealant when cured provides low thermal conductivity and flexibility at temperature extremes so as to be able to endure the vibration associated with aircraft gas turbine jet engine applications. The silicone rubber sealant also provides good ablative characteristics as well as resistance to weathering, ozone and fluids, such as hydraulic fluid, that are normally encountered in the operation of aircraft gas turbine jet engine.

After the curing of the composite layer fire protection arrangement of the instant invention, any required reinforcing ribs or other structures may be attached to the metal surface by any suitable means such as by riveting. Any riveting of such structures should be preferably accomplished by the use of suitable high temperature metal rivets, such as those composed of Monel alloys. Even though the reinforcing ribs or other structures are secured to the metal surface by rivets which pass through the composite layer fire protection layer, it has been found that the resultant riveted construction does not loosen when the metal surface is subjected to the vibration associated with the operation of a gas turbine jet engine used for aircraft propulsion.

If a jet fuel fire does occur within the vicinity of the fire protection arrangement for a metal surface, the ablative characteristics of the second silicone rubber sealant permit it to be initially ablated while at the same time precluding the underlying ceramic fiber fabric layer from fraying. Thus, the composite layer fire protection arrangement of the present invention precludes a jet fuel fire from melting the metal surface and penetrating the metal surface skin. This arrangement fully meets the FAR 25 requirement for containment of a fire for a predetermined period of time to permit such fire to be detected and the flow of jet fuel to such fire to be interrupted.

The foregoing has outlined rather broadly the more pertinent and important features of the present invention in order that the detailed description of the invention that follows may be better understood so that the present contributions to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWING

For a fuller understanding of the nature and objects of the invention, reference should be had to the following detailed description taken in conjunction with the accompanying drawing in which:

FIG. 1 is cross sectional view of a metal surface to which the composite layer fire protection arrangement has been applied in accordance with a preferred embodiment of the present invention.

FIG. 2 is a cross sectional view of a metal skin to which the composite layer arrangement has been applied and illustrates the riveting of a reinforcing rib to the metal skin.

FIG. 3 is a side elevation of an aircraft gas turbine jet engine propulsion system with which the present invention may be used to advantage.

Similar numerals refer to similar parts in all FIGURES.

DETAILED DESCRIPTION OF THE INVENTION

Referring now to the drawings in detail and in particular to FIG. 1, 10 generally designates a light weight composite layer fire arrangement for providing fire protection from a fire for a predetermined period of time that is constructed in accordance with a preferred embodiment of the invention. It should be understood that the thicknesses of the various layers as seen in FIG. 1 are for illustrative purposes only and should not be considered to represent the relative actual thicknesses of the various layers. The metal surface 12 to be protected from melting or penetration from a jet fuel fire is a typical aluminum alloy used in aircraft applications such as the 2024-T3 or 7075-T6 alloys and should be considered as exemplary only. The metal surface 12 may be part of a component of an aircraft gas turbine jet engine propulsion system, as seen in FIG. 3, and as will be described further hereinafter. The metal surface 12 as is common in aircraft applications is considered to have been subjected to a suitable anodizing process to provide corrosion protection and to promote bonding and paint adhesion characteristics.

The surface of the metal skin 12 is then suitably prepared for application of a first layer of silicone rubber sealant. This cleaning step typically includes cleaning the metal surface 12 with a suitable chlorinated solvent and then cleaning the metal, surface 12 further with a slightly abrasive pad or a coarse lint-free cloth. The metal surface 12 is rinsed with a suitable solvent, such as acetone, to remove any possible residue from the initial cleaning. The metal surface 12 then has applied to it a thin coating of a suitable primer 14 by dipping, brushing or spraying. A primer that has been used to advantage with the present invention is the DOW CORNING 1200 prime coat. After the primer 14 has been permitted to thoroughly dry, a first silicone rubber sealant layer 16 is applied over the primer 14. A suitable silicone rubber sealant is the DOW CORNING 90-006 Aerospace Sealant available from the Dow Corning Corporation as is the DOW CORNING 1200 prime coat. The silicone rubber sealant is typically a two part system that has a base portion and a catalyst portion with such portions being suitably mixed in the correct proportions. When the silicone rubber sealant portions have been suitably blended, the resulting material is now catalyzed and may be applied as a non-flowing material to the metal surface 12 and tooled to any desired configuration and buildup.

A layer 18 of a suitable light weight fabric woven from strong continuous alumina-boria-silica composite fibers is then applied to the first uncured silicon rubber sealant layer 16. The drapability characteristic of the ceramic fiber fabric layer 18 permits it to easily conform to the contours of the metal surface 12. A ceramic fiber fabric that is used in the preferred embodiment of the present invention is the NEXTEL 312 aerospace fabric in a typical style of AF-10 which has an exemplary thickness of around 0.010 inch. The NEXTEL 312 aerospace fabric may be obtained from the 3M company. Such a ceramic fabric layer retains strength and flexibility with little shrinkage at elevated temperatures. The ceramic fabric layer 18 is preferably applied to the first silicone rubber sealant layer 16 with a slight pressure to enhance the tendency of the first silicone rubber layer 16 to wick up or be forced up into the ceramic fabric layer 18 to, in effect, embed the ceramic fabric layer 18 within the first silicone rubber sealant layer 16. Such slight pressure may be applied, for example, by suitable vacuum bagging as is known in the art. The first silicone rubber sealant layer may then be cured at room temperature, if so desired.

A second layer 20 of uncured silicone rubber sealant may then be applied to the surface of the ceramic fiber fabric layer 18 so that it is essentially embedded within the two opposing first and second layers 16 and 20 of silicone rubber sealant. The first and second silicone rubber layers 16 and 20 may then be co-cured at room temperature to form rubbery solids or the second silicone rubber layer 20 may be cured subsequent to the curing of the first layer 16. Thus, a composite layer fire protection arrangement 10 has been provided for fire protection for the metal surface 12 in the event of fire caused for example by leaking jet fuel.

The second silicone rubber sealant layer 20 will initially ablade to expose the ceramic fiber fabric layer 18 which will then further contain the fire for a predetermined period of time in compliance with the requirements of FAR 25, during which period of time the cause of the fire will be determined and the flow of fuel to the fire will be interrupted. It has been found that the arrangement seen in FIG. 2 is resistant to the vibration commonly experienced in aerostructures and that the arrangement 10 is also resistant to engine oil, jet A fuel, and to SKYDROL hydraulic fluid.

Referring now to FIG. 2, it is seen that the light weight composite layer fire protection arrangement 10 of the present invention has been applied to a metal surface 12 and has been cured. It is then possible to attach a desired structure to the metal surface, as by riveting. Any secondary structure may be so secured to the metal surface 12 and can be any of a number of structures that are commonly used in the assembly and construction of aerostructures. For example, and not by way of limitation, a reinforcing rib assembly 22 is shown as being attached to the metal surface 12 by suitable rivets 24. The rivets 24 are preferably made from a metal, such as a Monel alloy, which will withstand elevated temperatures commensurate with a jet fuel fire for a time in compliance with the requirements of FAR 25 and will not melt or deform in any material respect to permit flame from a fire to penetrate the metal surface 12 through the path of the rivets 24. As seen in FIG. 2, the reinforcing rib assembly 22 comprises a Z shaped member 26 that is secured to a angle member 28 in a suitable manner, as by rivets 30.

Referring now to FIG. 3, an exemplary application of the invention 10 is illustrated. While the invention 10 may find application in any requirement that needs a fire to be contained for a predetermined period of time, it finds particular application in an aeronautical application for which its light weight, lower cost and fire limiting capabilities are singularly suited. For example, an aircraft gas turbine jet engine propulsion system 32 is illustrated. The system 32 includes an aircraft gas turbine jet engine 34 encased in a core cowl 36 which terminates in a nozzle 38.

The propulsion system 32 further includes a nacelle 40 that comprises a nose cowl 42, a fan cowl 44, and a thrust reverser section 46, as is well known in the art. The system 32 further can be considered to include a suitable pylon structure 48 attached to the wing (not shown) of an aircraft. The pylon structure 48 attaches to and supports the engine 34 in a conventional manner and is the avenue for supply of jet fuel to the engine 34 as well as various other pneumatic, electrical and electronic couplings. The present invention 10 finds particular application within any component of the propulsion system 32 which must comply with the relevant requirements of FAR 25 relating to the containment of a fire. While not illustrated, the invention 10 would also be applicable to any shroud surrounding the auxiliary power unit (APU) of an aircraft.

The foregoing has illustrated how the light weight composite layer arrangement of the present invention provides fire protection to a metal surface to contain a fire for a predetermined period of time in compliance with Federal Airworthiness Requirements. The particular arrangement and the method described for its construction should be considered as a baseline and various changes may be made to such within the scope of the invention such as various changes of the particular materials recited and the addition of a top coat and the like. Further, in some applications it may be adequate to omit the application of the second silicone rubber sealant layer to the ceramic fiber fabric layer since such ceramic fiber fabric is partially embedded in the first silicone rubber sealant layer.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. A light weight composite layer arrangement for providing fireproof protection for a metal surface of a cowling and nacelle skin of an aircraft gas turbine jet engine nacelle component from a fire having a temperature of up to 2000° F. for a predetermined period of time that exceeds 15 minutes, which arrangement comprises:

a first layer of silicone rubber sealant applied directly to a metal surface of a cowling and nacelle skin of an aircraft gas turbine engine nacelle component to be protected, and a a layer of fabric woven from ceramic fiber applied directly to said silicone sealant layer to adhere thereto and to become embedded therein whereby the occurrence of a fire in the vicinity of said protected metal surface will be precluded from injuring such metal surface for a predetermined period of time to provide fireproof protection.

2. The composite layer arrangement of claim 1 which further includes a second layer of silicone rubber sealant applied to the outer surface of the ceramic fabric layer.

3. The composite layer arrangement of claim 2 wherein application of the silicone layers and the ceramic fabric layer provide a unitary composite layer by the inherent adhesive properties of the silicone sealant layers.

4. The composite layer arrangement of claim 1 further includes a primer layer applied directly to the metal surface and having said silicone sealant applied to the outer surface of such primer layer.

5. The composite layer arrangement of claim 1 wherein the metal surface comprises an aluminum alloy.

6. The composite layer arrangement of claim 1 wherein the ceramic fiber fabric is woven from continuous alumina-boria-silica composition fibers.

7. The composite layer arrangement of claim 2 wherein the first and second silicone rubber sealant layers are applied in an uncured state and are thereafter co-cured to form the composite fire protection arrangement.

8. The composite layer arrangement of claim 2 wherein the first silicone rubber sealant layer is cured after application thereto of the ceramic fiber layer and prior to the application and curing of the second silicone rubber sealant layer.

9. The composite layer arrangement of claim 8 wherein the silicone rubber sealant layers are cured at room temperature.

10. The composite layer arrangement of claim 8 wherein the first and second silicone rubber sealant layers used are chosen from a group of silicon rubber sealant materials having low thermal conductivity, good ablative characteristics and are adapted to withstand elevated temperatures for periods of time commensurate with containing a fire associated with an aircraft gas turbine jet engine.

11. The composite layer arrangement of claim 10 wherein said first and second silicone rubber sealant layers are applied in an uncured state so as to permit the ceramic fabric layer to become embedded in said layers of silicone sealant whereby if such composite layer fire protection arrangement is exposed to a jet fuel fire the ablative characteristics of the second silicone sealant layer permit such layer to be gradually ablated to expose the ceramic fiber layer which further acts to contain the fire for a predetermined period of time and thereby preclude melting of the metal surface.

12. The composite layer arrangement of claim 1 which further includes at least one reinforcing rib to be secured to the metal surface after application of the composite layer fire protection arrangement to such metal surface.

13. The composite layer of claim 12 wherein the reinforcing rib is secured to the metal surface by rivets comprising a metal which withstands high temperatures without deformation.

14. A method for easily installing an arrangement for providing fireproof fire protection for a metal surface of a cowling and nacelle skin of an aircraft gas turbine jet engine nacelle enclosure for a predetermined period of time, which method comprises the steps of:
   applying an uncured silicone rubber sealant layer directly to a metal surface of a cowling and nacelle skin to be protected;
   applying a layer of fabric woven from ceramic fibers to said silicone rubber sealant layer in a manner to cause said fabric layer to adhere to and to become embedded in said sealant layer, and
   curing said silicone rubber sealant layer in place on said metal surface.

15. The method of claim 14 which further includes the step of applying a second silicone rubber sealant layer to the ceramic fiber layer.

16. The method of claim 15 wherein the first and second layers of silicone rubber sealant are applied in an uncured state so as to permit said ceramic fiber layer to become embedded within said two such silicone layers, and thereafter co-curing such silicone rubber layers to form a unitary fireproof fire protection system.

17. The method of claim 14 which further includes the step of initially applying a prime coat layer to the metal surface before applying the first silicone rubber sealant layer.

18. The method of claim 17 which further includes the steps of cleaning said metal surface with a suitable cleaning material and thereafter thoroughly removing any residue of such cleaning material prior to application of the first silicone rubber sealant layer.

19. The method of claim 14 wherein the silicone rubber material is a two part silicone rubber system that is mixed to form an uncured non-flowing silicone rubber material that is applied as the first and second layers so that the ceramic fiber fabric layer is embedded between said first and second layers, and
   curing the silicone rubber layers to form a unitary composite fire protection system.

20. The method of claim 14 wherein the ceramic fiber fabric layer is provided by a fabric woven of continuous alumina-boria-silica composite fibers.

\* \* \* \* \*